US005895637A

United States Patent [19]
Wilkens et al.

[11] Patent Number: 5,895,637
[45] Date of Patent: Apr. 20, 1999

[54] PROCESS FOR PREPARING SODIUM DISILICATE HAVING A HIGH ION-EXCHANGE CAPACITY

[75] Inventors: Jan Wilkens, Hürth; Günther Schimmel, Erftstadt; Alexander Tapper, Mönchengladbach, all of Germany

[73] Assignee: Hoechst Aktiengesellschaft, Frankfurt, Germany

[21] Appl. No.: 08/723,025

[22] Filed: Sep. 30, 1996

[30] Foreign Application Priority Data

Oct. 12, 1995 [DE] Germany ............... 195 37 957

[51] Int. Cl.⁶ .................................................. C01B 33/32
[52] U.S. Cl. ........................... 423/333; 423/332; 510/511
[58] Field of Search ................................... 423/333, 332

[56] References Cited

U.S. PATENT DOCUMENTS

| | | | |
|---|---|---|---|
| 4,578,258 | 3/1986 | Rieck | 423/333 |
| 4,585,642 | 4/1986 | Rieck. | |
| 4,950,310 | 8/1990 | Rieck et al.. | |
| 5,211,930 | 5/1993 | Schimmel et al. | 423/333 |
| 5,229,095 | 7/1993 | Schimmel et al.. | |
| 5,268,156 | 12/1993 | Schimmel et al. | 423/333 |
| 5,308,596 | 5/1994 | Kotzian et al. | 423/333 |
| 5,356,607 | 10/1994 | Just. | |
| 5,417,951 | 5/1995 | Just | 423/333 |
| 5,520,860 | 5/1996 | Tapper et al.. | |
| 5,614,160 | 3/1997 | Gill et al. | 423/333 |
| 5,776,893 | 7/1998 | Borgstedt et al. | 423/333 |

FOREIGN PATENT DOCUMENTS

| | | |
|---|---|---|
| 164 552 | 4/1988 | European Pat. Off.. |
| 0320770 | 6/1989 | European Pat. Off.. |
| 425 428 | 10/1990 | European Pat. Off.. |
| 0425428 | 12/1993 | European Pat. Off.. |
| 0502913 | 8/1994 | European Pat. Off.. |
| 2.227.224 | 11/1975 | France. |
| 3100942 | 7/1982 | Germany. |
| 3417649 | 11/1985 | Germany. |
| 43 30 868 | 3/1995 | Germany. |
| 4330868 | 3/1995 | Germany. |

OTHER PUBLICATIONS

Morey, G. W., *Z. anorg. Chem.* 86:305–321 (1914).
Franke, J., *Bull. Soc. Chim.* 17:454–458 (1950).
Willgallis, et al, *Glastechnische Berichte* 37:194–200 (1964).
Hubert et al. *Comptes rendus* 278:1453–1455, Series "D".
Beneke, K., et al, *Am. Mineral* 62:763–771 (1977).
Derwent Publication Ltd., 92–335303, JP-A-04 238 809 Nippon Chem. Ind. Co. Ltd..

*Primary Examiner*—Wayne Langel
*Attorney, Agent, or Firm*—Miles B. Dearth

[57] ABSTRACT

The invention relates to a process for preparing sodium disilicate in the β form having a high ion-exchange capacity and a molar ratio $Na_2O:SiO_2$ of about 1:2 from a silicate source and sodium hydroxide solution at elevated temperature, with the product formed being separated off by filtration, wherein the product is further heat treated at from 450° to 780° C. and/or is pressed to form compact parts.

4 Claims, No Drawings

PROCESS FOR PREPARING SODIUM DISILICATE HAVING A HIGH ION-EXCHANGE CAPACITY

The invention relates to a process for preparing sodium disilicate in the β form having a high ion-exchange capacity and a molar ratio $Na_2O:SiO_2$ of about 1:2 from a silicate source and sodium hydroxide solution at elevated temperature, with the product formed being separated off by filtration, a product prepared by this process and its use.

Numerous processes for preparing crystalline sodium silicates and sodium disilicates have been described in the literature. Depending on the type and composition of the starting materials and the various process steps described in the literature, crystalline silicates of a wide variety of types and compositions are obtained.

Thus, DE-A 34 17 649 describes a process in which hydrated sodium silicates are treated with crystal nuclei, the reaction mixture is heated and dewatered and the dewatered reaction mixture is held at a temperature of at least 450° C., but below the melting point, at which the crystalline sodium silicate having a sheet structure is formed. Below this temperature range, only amorphous sometimes undefinable products are obtained.

EP-A-0 320 770 describes a process for preparing a sodium silicate having a sheet structure, in which process an X-ray-crystalline sheet silicate is dissolved in water and subsequently evaporated at elevated temperature. This process starts with one crystalline sodium sheet silicate and gives, by means of the treatment mentioned, a sodium sheet silicate having a different structure.

Furthermore, DE-A 31 00 942 describes a process for preparing crystalline sodium silicates having a $SiO_2:Na_2O$ ratio of from 2:1 to 3:1 by heating sodium silicate glasses or sodium carbonate and quartz.

Hydrated, crystalline sodium silicates having a kanemite structure are obtained by dispersing silica in methanol in a first step and then admixing this with cold sodium hydroxide solution. Owing to the controlled addition of the individual substances, this process is very complicated and in addition requires special safety precautions because of the use of flammable methanol (Beneke and Lagaly, Am. Mineral. 62, (1977) 763–771).

Willgallis and Range (Glastechnische Berichte, 37 (1964) 194–200) describe the preparation of α-, β- and γ-$Na_2Si_2O_5$ by heat treating molten and unmolten, dewatered sodium water glass. The products formed here have a sheet structure, their crystallinity is demonstrated by the X-ray diffraction patterns. It was shown that various crystal modifications can be obtained as a function of the prevailing temperature.

Morey (Z. anorg. allg. Chem., 86 (1914) 305–321), Franke (Bull. Soc. Chim., 17 (1950) 454–458) and Hubert, Guth and Wey (Comptes rendus, 278 Série D (1974) 1453–1455) describe the preparation of β-$Na_2Si_2O_5$ either by hydrothermal crystallization of amorphous sodium disilicate glasses or by hydrothermal reaction and crystallization of a silicate source (e.g. amorphous or crystalline $SiO_2$) with sodium hydroxide solution. The reaction temperatures can here be between 250° and 300° C. the reaction times in the range from hours to some days. The total solids concentrations should typically correspond to a supersaturated solution, but be at least 40%.

Finally, EP-B-0 502 913 describes a process for preparing crystalline, highly pure β-sodium disilicate by starting from quartz sand and sodium hydroxide solution and/or aqueous solutions of amorphous sodium disilicate. Restricted concentration and temperature conditions are necessary for this process. In it, a highly concentrated solution of the starting materials (silicate source and sodium hydroxide solution) having a total solids concentration of from 50 to 75% by weight is, in a first step, heated to at least 235° C. and in a second step the total solids content may, if desired, be increased by removing water from the reaction mixture where, if the second step is carried out, the water removed in the second step is, in a third step, added back completely or in part to the reaction mixture during or immediately after the subsequent cooling to from 90 to 130° C. and the crystalline sodium disilicate formed is subsequently separated off. This process necessitates high concentrations of total solids in the reaction solution (above 50% by weight).

The (sheet) silicates described in the abovementioned prior art are often additionally compacted. Thus, EP-0 425 428 B1 describes a process for preparing crystalline sodium silicates having a sheet structure, in which amorphous sodium silicate having a water content of from 15 to 23% by weight is calcined in a rotary tube furnace at temperatures of from 500 to 850° C. the calcined material is, after crushing and milling, fed to a roller compactor and the compacted material obtained is, after preliminary comminution and sieving, processed to give a granular material having a bulk density of from 700 to 1000 g/l.

DE-A-43 30 868 describes a process for preparing compacted, granular sodium silicates in which the sodium silicate having a mean particle diameter of <500 μm is first mixed with a material which increases its hardness before it is converted by compaction, comminution and sieving into a granular, compacted material having particle sizes of from 0.1 to 5 mm.

However, the sodium silicates prepared by the abovementioned processes are either not in the β form or else, if materials in this form can be prepared using the processes described, they are frequently not sufficiently crystalline. In addition, it is often not possible to obtain homogeneous end products on transfer to the industrial scale. For use of the disilicates in laundry detergents and cleaners, the lime binding capacity (LBC), which is often correlated with the crystallinity of the samples, is an important parameter. To ensure satisfactory functioning of the surfactant system and thus a high primary washing action, a very rapid and complete removal of the hardeners from the washing water is necessary.

It is therefore an object of the invention to overcome the abovementioned disadvantages and to provide a process in which β-sodium disilicates having a high ion-exchange capacity, increased crystallinity and increased LBC values can be obtained in a simple way. In addition, the lime binding capacity of these substances should be available after as short as possible a time.

This object is achieved by a process for preparing sodium disilicate in the β form having a high ion-exchange capacity and a molar ratio $Na_2O:SiO_2$ of about 1:2 from a silicate source and sodium hydroxide solution at elevated temperature, with the product formed being separated off by filtration, wherein the product is further heat treated at from 450 to 780° C. and/or is pressed to form compact parts.

The abovementioned elevated temperature is, in particular, the range from 235 to 300° C. (hydrothermal reaction conditions).

The product thus obtained has an increased crystallinity and thus a higher lime binding value.

According to the process of the invention, the product can be either further heat treated or it is first further heat treated and then pressed.

The product is preferably further heat treated at a temperature of from 600 to 720° C.

Similarly, the product is preferably further heat treated for from 0.25 to 5 hours.

According to the invention it is also possible for the product which has been further heat treated to be pressed to give compact parts.

Preferably, it is pressed to give compact parts by means of a roller compactor and the compact parts are processed by mechanical comminution to give a granular material. For example, the compacts can be milled or broken up to particle sizes of from 0.2 to 2 mm.

The sodium disilicates of the invention are preferably used in laundry detergents and cleaners.

The invention likewise provides a sodium disilicate in the β form having a high ion-exchange capacity and a molar ratio $Na_2O:SiO_2$ of about 1:2, which has been prepared by the process of the invention.

In the following examples, which illustrate the invention, the lime binding capacity of the crystalline sodium disilicates obtained was determined as follows:

Method 1

30 g of a calcium solution (131.17 g of $CaCl_2.2H_2O$ are dissolved in distilled water and made up to 5000 g) are mixed with 5.6 g of a buffer solution (75.07 g of glycine and 58.4 g of NaCl are dissolved in distilled water and made up to 1000 ml) and made up to 999 g with distilled water. This solution which corresponds to a water hardness of 30° dH (German hardness) or 300 mg of CaO/l, is heated to 20° C. and admixed with 1 g of sample. The solution was stirred for a certain time (e.g. 10 minutes), filtered and the calcium remaining in the filtrate was determined complexometrically. The difference between this and the original calcium content enabled the calcium binding capacity, generally referred to as the LBC value, to be determined.

Method 2

The calcium stock solution contains 157.30 g of $CaCl_2.2H_2O$ which is dissolved in distilled water and made up to 1000 ml. To prepare the buffer solution, 88.5 g of glycine and 69.04 g of NaCl are dissolved in 520 ml of 1N sodium hydroxide solution and made up to 2000 ml with distilled water.

980 ml of distilled water, 20 ml of buffer solution and a total of 5 ml of calcium stock solution are mixed and heated to 20° C. The resulting water hardness likewise corresponds to 30° dH (German hardness). After addition of 1 g of test substance, the unbound calcium concentration is continuously detected by means of an ion-sensitive electrode (e.g. ORION, model 900 200). As a measure of the rapidity of the water softening process, the LBC value is shown after 1 minute and after 3 minutes in the examples below.

EXAMPLE 1 (COMPARATIVE EXAMPLE)

A commercial sodium water glass solution (Henkel 58/60) was adjusted to an $Na_2O:SiO_2$ ratio of 1:2 by addition of sodium hydroxide solution and concentrated by evaporation. The resulting solids content of the solution was 62.8%. 1225 g of this water glass solution were placed in a 1 l stirring autoclave made of V4A steel and subsequently heated to 280° C. under the autogenous water vapor pressure over a period of 2½ hours. After a crystallization time of 5 hours, the pressure vessel was cooled to 80° C. over a period of 1 hour and the aqueous suspension was filtered through a 5 μm pressure filter. The solid retained was washed a number of times with distilled water and dried at 110° C.

The X-ray diffraction pattern of the hydrothermally crystallized intermediate can be indexed completely using the literature data for the β modification of $Na_2Si_2O_2$ (low temperature modification). As a measure of the crystallinity of the sample, the absolute intensity of the X-ray reflection having a lattice spacing of 2.971 Å is measured; a value of $I_{2.971 Å}=3192$ cts was determined.

The lime binding capacity of the sample was determined as 78 mg of Ca/g using Method 1. According to Method 2, the LBC was 48 mg of Ca/g after 1 minute and 66 mg of Ca/g after 3 minutes.

EXAMPLE 2

One part in each case of the intermediate from Example 1 was further heat treated for one hour at various temperatures. Table 1 shows the intensities determined from the X-ray diffraction patterns.

For the sample further heat treated at 700° C., which owing to the further treatment has a significantly increased crystallinity, the lime binding capacity was determined as 92 mg of Ca/g by Method 1. According to Method 2, the LBC was 64 mg of Ca/g after 1 minute and 82 mg of Ca/g after 3 minutes.

For the sample further heat treated at 720° C., the lime binding capacity was determined as 101 mg of Ca/g by Method 1. According to Method 2, the LBC was 65 mg of Ca/g after 1 minute and 84 mg of Ca/g after 3 minutes.

EXAMPLE 3 (COMPARATIVE EXAMPLE)

The preparation of the hydrothermally crystallized β-$Na_2Si_2O_5$ was carried out as described in Example 1 using a concentrated water glass solution (solids content 62.6%; ratio $Na_2O:SiO_2=1:2$). The crystallization time at 280° C. was 2 hours.

The X-ray diffraction pattern of the intermediate without heat treatment can be indexed completely using the literature data for the β form of $Na_2Si_2O_5$. As a measure of the crystallinity of the sample, an absolute intensity of $I_{2.971 Å}=4095$ cts was determined.

The lime binding capacity of the sample was determined as 90 mg of Ca/g by Method 1. According to Method 2, the LBC was 54 mg of Ca/g after 1 minute and 72 mg of Ca/g after 3 minutes.

EXAMPLE 4

To replicate the compaction process under laboratory conditions, part of the sample from Example 3 was pressed in a tableting press (pressing pressure about 5 kbar) and subsequently coarsely ground in an agate mortar.

The lime binding capacity of the sample prepared in this way was determined as 92 mg of Ca/g by Method 1. According to Method 2, the LBC was 60 mg of Ca/g after 1 minute and 92 mg of Ca/g after 3 minutes.

EXAMPLE 5

Part of the sample from Example 3 was further heat treated for 1 hour at 700° C. From the X-ray diffraction pattern, an absolute intensity of $I_{2.971 Å}=5402$ cts was determined.

The lime binding capacity of the product which had been further heat treated was determined as 105 mg of Ca/g by Method 1. According to Method 2, the LBC was 58 mg of Ca/g after 1 minute and 75 mg of Ca/g after 3 minutes.

EXAMPLE 6

Part of the sample from Example 5 was pressed in a tabletting press (pressing pressure about 5 kbar) and subsequently coarsely ground in an agate mortar.

The lime binding capacity of the sample prepared in this way was determined as 109 mg of Ca/g by Method 1. According to Method 2, the LBC was 84 mg of Ca/g after 1 minute and 118 mg of Ca/g after 3 minutes.

EXAMPLE 7

In order to test the process of the invention in an industrial-scale compaction experiment serving as an example, a number of batches of $\beta$-$Na_2Si_2O_5$ were hydrothermally crystallized in a 5 l stirring autoclave as described in Example 1 and the powders obtained were combined.

The X-ray diffraction pattern of the intermediate can be indexed completely using the literature data for the $\beta$ modification of $Na_2Si_2O_5$. As a measure of the crystallinity of the sample, an absolute intensity of $I_{2.971 \text{ Å}}=3680$ cts was determined.

The lime binding capacity of the intermediate was determined as 84 mg of Ca/g by Method 1. According to Method 2, the LBC was 54 mg of Ca/g after 1 minute and 74 mg of Ca/g after 3 minutes.

5 kg of the $\beta$-$Na_2Si_2O_5$ thus obtained were pressed on a compactor (BEPEX GmbH) having a roller diameter of 200 mm at a line load of 30 kN/cm and subsequently milled to produce a granular material.

The lime binding capacity of the granular material was determined as 88 mg of Ca/g by Method 1. According to Method 2, the LBC was 72 mg of Ca/g after 1 minute and 86 mg of Ca/g after 3 minutes.

TABLE 1

| Further treatment temperature [° C.] | 400 | 450 | 500 | 550 | 600 | 660 | 680 | 700 | 720 |
|---|---|---|---|---|---|---|---|---|---|
| $I_{2.971 \text{ Å}}$ [cts] | 3315 | 3569 | 3624 | 3869 | 4122 | 4199 | 4231 | 4489 | 4761 |

We claim:

1. A process for preparing sodium disilicate product having a molar ratio $Na_2O:SiO_2$ of about 1:2 comprising:

(1) contacting a silicate source and sodium hydroxide solution at elevated temperature, (2) separating said product from said solution by filtration, (3) further heat treating said product at from 450° to 780° C. for 0.25 to 5 hours, and optionally (4) pressing said heat treated product to form compact parts, wherein said product is in the $\beta$ form and has improved ion-exchange capacity.

2. The process as claimed in claim 1, wherein the further heat treatment is carried out at 600° to 720° C.

3. The process as claimed in claim 1 wherein said product then pressed to form compact parts after said heat treating at 450° to 780° C.

4. The process as claimed in claim 3, wherein said product is pressed to form compact parts by means of a roller compactor and the compact parts are processed into a granular material by mechanical comminution.

* * * * *